United States Patent
Ha

(10) Patent No.: US 11,338,438 B2
(45) Date of Patent: May 24, 2022

(54) METHOD, SYSTEM AND NON-TRANSITORY COMPUTER-READABLE RECORDING MEDIUM FOR DETERMINING A MOVEMENT PATH OF A ROBOT

(71) Applicant: Bear Robotics, Inc., Redwood City, CA (US)

(72) Inventor: Jungwoo Ha, Redwood City, CA (US)

(73) Assignee: BEAR ROBOTICS, INC., Redwood City, CA (US)

( * ) Notice: Subject to any disclaimer, the term of this patent is extended or adjusted under 35 U.S.C. 154(b) by 210 days.

(21) Appl. No.: 16/257,631

(22) Filed: Jan. 25, 2019

(65) Prior Publication Data

US 2020/0238523 A1 Jul. 30, 2020

(51) Int. Cl.
*B25J 9/16* (2006.01)

(52) U.S. Cl.
CPC ........... *B25J 9/1676* (2013.01); *B25J 9/1653* (2013.01)

(58) Field of Classification Search
CPC ....... B25J 9/1676; B25J 9/1653; F01D 21/14; G05D 1/0214
See application file for complete search history.

(56) References Cited

U.S. PATENT DOCUMENTS

| | | | | |
|---|---|---|---|---|
| 8,467,953 B2* | 6/2013 | Naderhirn | .............. | G08G 5/045 701/301 |
| 9,164,510 B2 | 10/2015 | Mian et al. | | |
| 9,174,342 B2* | 11/2015 | Pinter | .................... | G06Q 50/22 |
| 10,248,120 B1* | 4/2019 | Siegel | .................. | G05D 1/0223 |
| 2009/0254235 A1* | 10/2009 | Kuroda | .................... | G01S 11/12 701/23 |
| 2010/0222954 A1* | 9/2010 | Ichinose | .............. | G05D 1/0289 701/26 |
| 2011/0304540 A1* | 12/2011 | Nishimoto | .............. | A63F 13/06 345/158 |
| 2014/0018996 A1* | 1/2014 | Mian | .................... | G05D 1/0212 701/26 |

(Continued)

FOREIGN PATENT DOCUMENTS

JP 2018092588 A 6/2018
KR 1020050108396 A 11/2005

(Continued)

OTHER PUBLICATIONS

Bimal Paneru, Niraj Basnet, Sagar Shrestha, Rabin Giri and Dinesh Baniya Kshatri; "Autonomous Navigation of a Mobile Robot in Indoor Environments", Zerone Scholar vol. 1, No. 1, Nov. 2016.

*Primary Examiner* — Nicholas Kiswanto
*Assistant Examiner* — Jamal A Shah
(74) *Attorney, Agent, or Firm* — Dinsmore & Shohl LLP; Yongsok Choi, Esq.

(57) ABSTRACT

According to one aspect of the invention, there is provided a method for determining a travel route of a robot, comprising the steps of: identifying at least one obstacle with respect to a position of a robot; calculating an obstacle radius in which the at least one obstacle has influence, with reference to at least one of information on motion properties of the at least one obstacle and information on a relationship with at least one other obstacle associated with the at least one obstacle; and determining an optimum travel route of the robot with reference to the calculated obstacle radius and a task assigned to the robot.

6 Claims, 3 Drawing Sheets

(56) References Cited

U.S. PATENT DOCUMENTS

| | | | | |
|---|---|---|---|---|
| 2017/0276501 A1* | 9/2017 | Wise | ............... | G01C 21/20 |
| 2019/0108764 A1* | 4/2019 | Fragoso | ............... | G05D 1/12 |
| 2019/0286145 A1* | 9/2019 | LaFary | ............... | G05D 1/024 |
| 2020/0016754 A1* | 1/2020 | Skubch | ............... | G05D 1/0291 |
| 2021/0080272 A1* | 3/2021 | Zhou | ............... | G05D 1/0088 |

FOREIGN PATENT DOCUMENTS

| | | | |
|---|---|---|---|
| KR | 102010005238 | A | 5/2010 |
| KR | 101179075 | B1 | 9/2012 |
| KR | 1020130094533 | A | 8/2013 |
| KR | 20160144848 | A | 12/2016 |
| WO | 2015072002 | A1 | 5/2015 |
| WO | 2017079341 | A2 | 5/2017 |

* cited by examiner

METHOD, SYSTEM AND NON-TRANSITORY COMPUTER-READABLE RECORDING MEDIUM FOR DETERMINING A MOVEMENT PATH OF A ROBOT

FIELD OF THE INVENTION

The present invention relates to a method, system, and non-transitory computer-readable recording medium for determining a travel route of a robot.

BACKGROUND

Robots are utilized to replace or assist people in various fields because they can automatically perform difficult tasks or repetitive operations. One of the basic and important objects in utilizing the robots is to establish safe and efficient path planning for performing tasks assigned to the robots. To this end, a variety of information on the robots and surroundings thereof is required. Particularly, information on radiuses of obstacles serves as important basic data in establishing path planning to prevent the robots from colliding with the obstacles.

Recently, the fourth industrial revolution has emerged, and the robots are attracting attention as items for the next generation industry. In this regard, various researches are being conducted on how to efficiently determine and control a travel route of a robot.

As an example of the related prior art, according to a technique disclosed in Korean Laid-Open Patent Publication No. 2016-144848, a mobile robot control apparatus is provided which determines a path of a mobile robot by using a distance between an obstacle and a mobile robot region having a first area. The mobile robot control apparatus comprises a user interface configured to receive a user input for selecting a magnitude of error such that the mobile robot region is filled with at least one circle having a second area smaller than the first area, wherein the magnitude of error is a maximum size of a third area corresponding to the first area minus the second area, and a control unit configured to identify the mobile robot region, to extract a mobile robot frame where a center of the at least one circle is positioned in the mobile robot region, to calculate a number and a position of the at least one circle to be placed on the mobile robot frame by using the magnitude of error, and to compare a radius of the at least one circle with a distance between the obstacle and a pixel including the center of the at least one circle.

However, according to the techniques introduced so far as well as the above-described conventional technique, a radius in which an obstacle may have influence is defined with respect to a boundary identified from an exterior of the obstacle, or with respect to a point at a certain distance from the identified boundary, and path planning is determined by measuring a distance between the obstacle and a robot on the basis of the radius. That is, even though the radius in which the obstacle may have influence can be changed due to motion properties of the obstacle, which are determined according to wheels or gears attached to the obstacle, or due to a relationship between the obstacle and another nearby obstacle (e.g., a relationship between a chair and a nearby table), the radius of the obstacle is determined only by applying fixed criteria without considering the above.

In this connection, the inventor(s) present a technique for calculating an obstacle radius in which an obstacle has influence, with reference to at least one of information on motion properties of the obstacle and information on a relationship with another obstacle associated with the obstacle, and determining an optimum travel route of a robot on the basis of the obstacle radius.

SUMMARY OF THE INVENTION

One object of the present invention is to solve all the above-described problems in the prior art.

Another object of the invention is to dynamically calculate an obstacle radius in which an obstacle has influence, with reference to at least one of information on motion properties of the obstacle and information on a relationship with another obstacle associated with the obstacle.

Yet another object of the invention is to more precisely calculate an obstacle radius in which an obstacle may have influence.

The representative configurations of the invention to achieve the above objects are described below.

According to one aspect of the invention, there is provided a method for determining a travel route of a robot, comprising the steps of: identifying at least one obstacle with respect to a position of a robot; calculating an obstacle radius in which the at least one obstacle has influence, with reference to at least one of information on motion properties of the at least one obstacle and information on a relationship with at least one other obstacle associated with the at least one obstacle; and determining an optimum travel route of the robot with reference to the calculated obstacle radius and a task assigned to the robot.

According to another aspect of the invention, there is provided a system for determining a travel route of a robot, comprising: an obstacle identification unit configured to identify at least one obstacle with respect to a position of a robot; an obstacle radius calculation unit configured to calculate an obstacle radius in which the at least one obstacle has influence, with reference to at least one of information on motion properties of the at least one obstacle and information on a relationship with at least one other obstacle associated with the at least one obstacle; and a route determination unit configured to determine an optimum travel route of the robot with reference to the calculated obstacle radius and a task assigned to the robot.

In addition, there are further provided other methods and systems to implement the invention, as well as non-transitory computer-readable recording media having stored thereon computer programs for executing the methods.

According to the invention, it is possible to dynamically calculate an obstacle radius in which an obstacle has influence, with reference to at least one of information on motion properties of the obstacle and information on a relationship with another obstacle associated with the obstacle.

According to the invention, it is possible to more precisely calculate an obstacle radius in which an obstacle may have influence.

DETAILED DESCRIPTION

Figure 1:
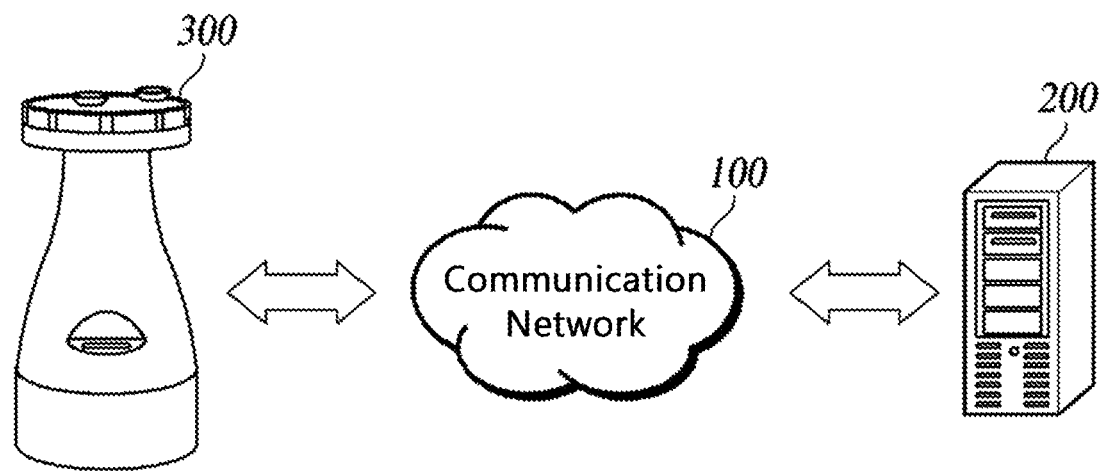
FIG. 1 schematically shows the configuration of the entire system for determining a travel route of a robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for determining a travel route of a robot according to one embodiment of the invention.

As shown in FIG. 1, the entire system according to one embodiment of the invention may comprise a communication network 100, a robot route management system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, Bluetooth communication (more specifically, Bluetooth Low Energy (BLE) communication), infrared communication, and ultrasonic communication.

Next, the robot route management system 200 according to one embodiment of the invention may communicate with the robot 300 to be described below via the communication network 100, and may function to identify at least one obstacle with respect to a position of the robot 300, to calculate an obstacle radius in which the identified obstacle has influence, with reference to at least one of information on motion properties of the obstacle and information on a relationship with another obstacle associated with the obstacle, and to determine an optimum travel route of the robot 300 with reference to the calculated obstacle radius and a task assigned to the robot 300.

Meanwhile, although the robot route management system 200 has been described as above, the above description is illustrative, and it will be apparent to those skilled in the art that at least a part of the functions or components required for the robot route management system 200 may be implemented in the robot 300 to be described below or included in an external system (not shown), as necessary. Further, in some cases, all of the functions and components of the robot route management system 200 may be implemented or included in the robot 300.

Next, the robot 300 according to one embodiment of the invention is a device that may communicate with the robot route management system 200 via the communication network 100, and may autonomously perform predetermined functions or assigned tasks without any operation of the user. The robot 300 may include a drive module (not shown) (e.g., a motor) for moving along a travel route. For example, the robot 300 may be at least partially similar to a robot cleaner, a robotic medical device, a guide robot, and the like.

Meanwhile, according to one embodiment of the invention, the robot 300 may include an application to assist in determining a travel route of the robot 300 according to the invention. The application may be downloaded from the robot route management system 200 or an external application distribution server (not shown).

Configuration of the Service Provision System

Hereinafter, the internal configuration of the robot route management system 200 crucial for implementing the invention and the functions of the respective components thereof will be discussed.

Figure 2:
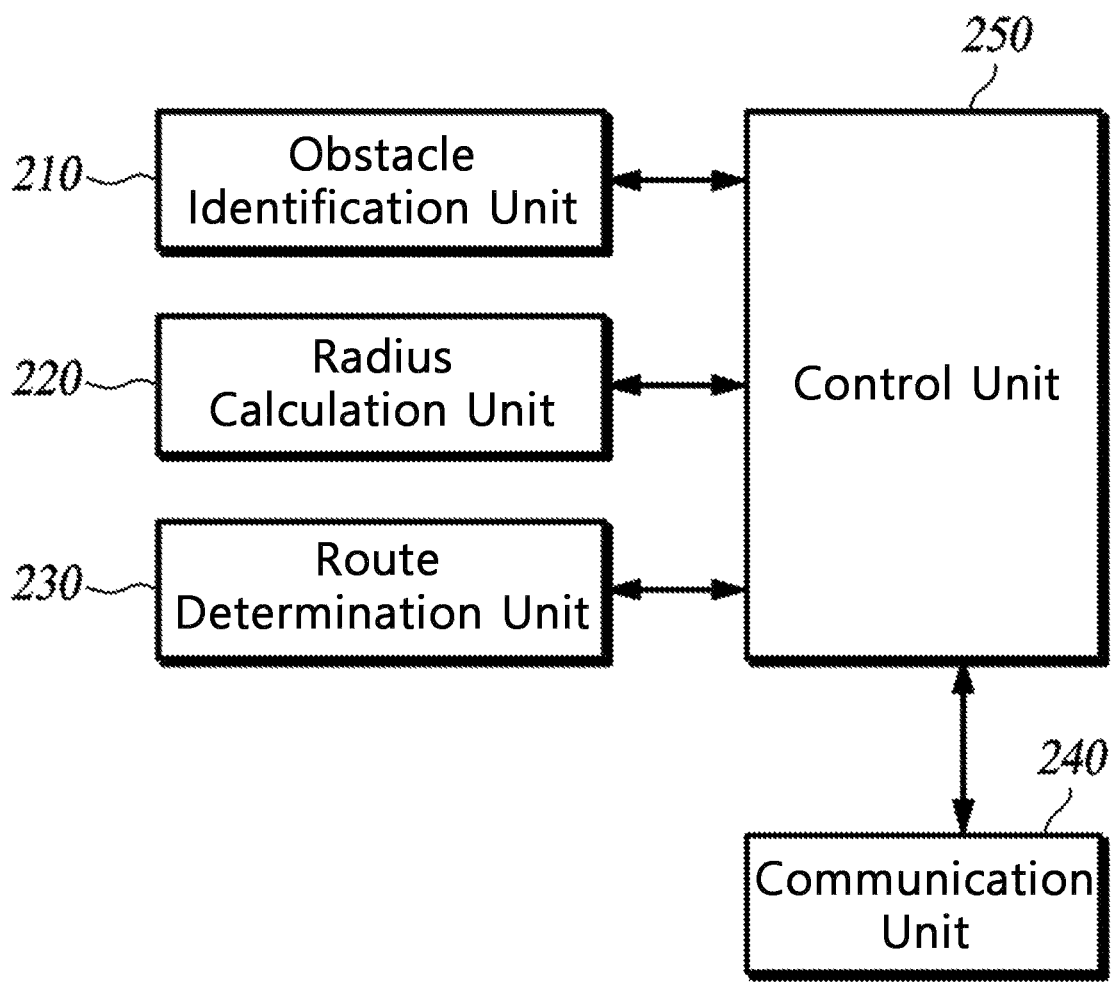
FIG. 2 illustrates the internal configuration of a robot route management system according to one embodiment of the invention.

FIG. 2 illustrates the internal configuration of the robot route management system 200 according to one embodiment of the invention.

Referring to FIG. 2, the robot route management system 200 according to one embodiment of the invention may comprise an obstacle identification unit 210, a radius calculation unit 220, a route determination unit 230, a communication unit 240, and a control unit 250. According to one embodiment of the invention, at least some of the obstacle identification unit 210, the radius calculation unit 220, the route determination unit 230, the communication unit 240, and the control unit 250 may be program modules that communicate with an external system (not shown). The program modules may be included in the robot route management system 200 in the form of operating systems, application program modules, and other program modules, while they may be physically stored in a variety of commonly known storage devices. Further, the program modules may also be stored in a remote storage device that may communicate with the robot route management system 200. Meanwhile, such program modules may include, but not limited to, routines, subroutines, programs, objects, components, and data structures for performing specific tasks or executing specific abstract data types according to the invention as will be described below.

First, the obstacle identification unit 210 according to one embodiment of the invention may identify at least one obstacle with respect to a position of the robot 300.

For example, the obstacle identification unit 210 may identify at least one predicted travel route with respect to a position of the robot 300, on the basis of a task assigned to the robot 300, and may identify the at least one obstacle as an obstacle located within a predetermined distance from the at least one predicted travel route identified as above. According to one embodiment of the invention, the task assigned to the robot 300 may be determined on the basis of at least one of a place where the robot 300 is positioned, a function of the robot 300, and a structure of the robot 300, and may be assigned by a user associated with the robot 300

(e.g., a restaurant owner in the case of a restaurant serving robot, or a doctor in the case of a medical robot), as necessary.

Meanwhile, the obstacle identification unit 210 according to one embodiment of the invention may identify at least obstacle located within a predetermined distance around the position of the robot 300 by means of a camera module (not shown) or a scanning module (not shown). For example, the camera module may include a two- or three-dimensional (e.g., depth-measurable) camera module, and the scanning module may include a two- or three-dimensional laser scanner module, electromagnetic wave scanner module, or white light scanner module. More specifically, the camera module may include a stereo vision type camera sensor, a TOF (Time-Of-Flight) type camera sensor, and a structured pattern type camera sensor, and the scanning module may include a scanning LiDAR (Light Detection And Ranging) type scanning sensor and a structured pattern type scanning sensor.

Next, the radius calculation unit 220 according to one embodiment of the invention may calculate an obstacle radius in which the obstacle has influence, with reference to at least one of information on motion properties of the obstacle and information on a relationship with another obstacle associated with the obstacle. According to one embodiment of the invention, the information on motion properties of the obstacle may include information on whether the obstacle is movable, information on a moving means (e.g., a wheel) of the obstacle, information on a structure of the moving means (e.g., a structure of a wheel axis), and the like. Further, according to one embodiment of the invention, the information on a relationship with another obstacle associated with the obstacle may include information on at least one of a travelable direction and a travelable distance of the obstacle, which are restricted or extended as the obstacle is directly or indirectly influenced by another obstacle located around (or within a predetermined distance from) the obstacle.

For example, the radius calculation unit 220 may determine the information on motion properties of the obstacle on the basis of at least one of an exterior, a function, and a structure of the obstacle, and may determine an obstacle radius in which the obstacle has influence, with reference to at least one of a travelable direction or angle and a travelable distance of the obstacle, which are identified according to the information on motion properties of the obstacle.

More specifically, if the obstacle is a stroller, the radius calculation unit 220 may identify a travelable direction of the stroller (e.g., a one-way direction when the stroller can only travel in that direction) and a travelable distance of the stroller (e.g., a distance over which the stroller can travel when its wheels are rotated for several seconds), on the basis of information on the number, shape, or axis of the wheels of the stroller, and may calculate an obstacle radius of the stroller on the basis of the identified direction and distance. According to one embodiment of the invention, in the case of the stroller that can only travel in a one-way direction as above, its obstacle radius may have a shape similar to an ellipse or a rectangle.

As another example, the radius calculation unit 220 may determine a relationship between a first obstacle identified by the obstacle identification unit 210 and at least one other second obstacle located around the first obstacle, and may calculate an obstacle radius of the first obstacle on the basis of degrees to which a travelable direction and a travelable distance of the first obstacle are restricted or extended due to the relationship. According to one embodiment of the invention, the relationship between the first and second obstacles may be determined with reference to a lookup table in which relationships between a plurality of obstacles are predetermined.

More specifically, if the first obstacle is a chair and the second obstacle is a desk, they may have a relationship where travelable distances of the chair in the leftward and rightward directions are partially restricted due to the structure of the desk (specifically, due to the legs of the desk where two of the legs are positioned to the left of the chair and the other two are positioned to the right of the chair). In this case, the radius calculation unit 220 may calculate an obstacle radius of the chair by partially restricting the leftward and rightward directions in which the chair can travel, according to the above relationship. Further, if the first obstacle is a chair and the second obstacle is a person sitting on (or standing off) the chair at a desk, they may have a relationship where travelable distances of the chair in the leftward and rightward directions are partially restricted as in the above case, while travelable distances of the chair in the forward and backward directions are extended (or increased) due to the depth of the body of the person (i.e., the depth of the torso when the person is sitting on the chair, or the depth of the legs when the person is standing off the chair). In this case, the radius calculation unit 220 may calculate an obstacle radius of the chair by restricting the travelable distances of the chair in the leftward and rightward directions and extending (or increasing) the travelable distances of the chair in the forward and backward directions, according to the above relationship.

As yet another example, the radius calculation unit 220 may identify at least one of a travelable direction and a travelable distance of an obstacle with reference to information on motion properties of the obstacle, and may restrict or extend at least one of the identified travelable direction and travelable distance with reference to information on a relationship with at least one other obstacle associated with the obstacle, thereby calculating an obstacle radius in which the obstacle has influence.

Meanwhile, according to one embodiment of the invention, a process of calculating an obstacle radius on the basis of at least one of information on motion properties of an obstacle and information on a relationship with another obstacle associated with the obstacle may be performed on the basis of AI (Artificial Intelligence) including machine learning or deep learning.

For example, if an obstacle is a wheeled chair and a table or person is located around the chair as another obstacle associated with the obstacle, an obstacle radius may be calculated on the basis of at least one of information on motion properties of the obstacle and information on a relationship with the other obstacle associated with the obstacle, by causing AI to repetitively learn the number of wheels of the chair, a travelable direction and a travelable distance of the chair according to the shape and axis of the wheels, a travelable direction and a travelable distance of the chair which are restricted or extended due to the table (e.g., the travel of the chair may be restricted in the directions where the legs of the table are located), a travelable direction and a travelable distance of the chair which are restricted or extended due to the table and person when the person is positioned about the chair, and the like.

Next, the route determination unit 230 according to one embodiment of the invention may determine an optimum travel route of the robot 300 with reference to the obstacle radius calculated by the radius calculation unit 220 and a task assigned to the robot 300.

Specifically, the route determination unit 230 may apply an obstacle radius calculated as above to an obstacle that is identified on a map associated with a place where the robot 300 is positioned, and may determine an optimum travel route for performing a task assigned to the robot 300, with respect to the map to which the obstacle radius is applied.

For example, a cost map corresponding to a place (or a predetermined area) where the robot 300 is located may be generated with reference to the calculated obstacle radius, and the route determination unit 230 may determine an optimum travel route for performing a task assigned to the robot 300, on the basis of the generated cost map. More specifically, an optimum travel route for the robot 300 to travel avoiding the obstacle efficiently and precisely may be determined by increasing a cost value on the cost map as the robot 300 approaches the obstacle radius of the obstacle on the map. Meanwhile, at least one of global path planning (GPP) and local path planning (LPP) may be determined on the basis of the cost map to which the obstacle radius is reflected, and an optimum travel route of the robot 300 may also be determined on the basis of the path planning.

Meanwhile, although the embodiments in which an optimum travel route of a robot is determined on the basis of a cost map have been mainly described above, it is noted that various methods other than using the cost map may be employed as long as the objects of the invention may be achieved.

Next, according to one embodiment of the invention, the communication unit 240 may function to enable data transmission/reception from/to the obstacle identification unit 210, the radius calculation unit 220, and the route determination unit 230.

Lastly, according to one embodiment of the invention, the control unit 250 may function to control data flow among the obstacle identification unit 210, the radius calculation unit 220, the route determination unit 230, and the communication unit 240. That is, the control unit 250 according to the invention may control data flow into/out of the robot route management system 200 or data flow among the respective components of the robot route management system 200, such that the obstacle identification unit 210, the radius calculation unit 220, the route determination unit 230, and the communication unit 240 may carry out their particular functions, respectively.

Figure 3:
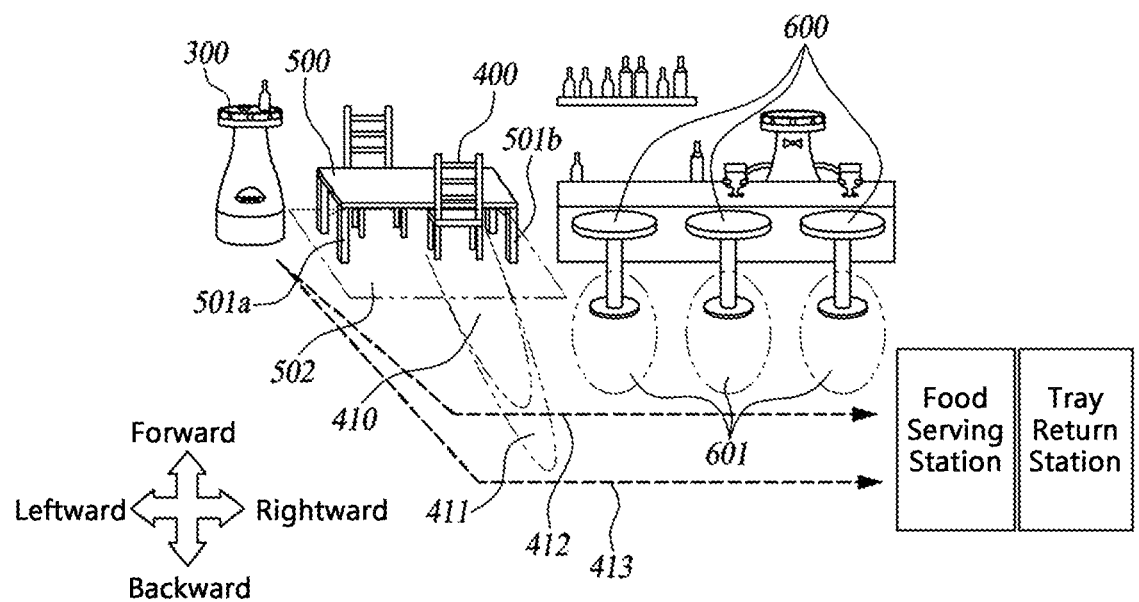
FIG. 3 illustrates how a travel route of a robot is determined according to one embodiment of the invention.

FIG. 3 illustrates how a travel route of the robot 300 is determined according to one embodiment of the invention.

Referring to FIG. 3, it may be assumed that the robot route management system 200 according to the invention is included in the robot 300, and a task related to food serving in a restaurant is assigned to the robot 300. Specifically, the robot 300 may be assigned a task of serving food to be provided to a customer to a table 500, or a task of removing food left by the customer from the table 500.

First, according to one embodiment of the invention, at least one obstacle may be identified with respect to a position of the robot 300.

For example, a chair A 400, a chair B 600, and the table 500 may be identified as obstacles, which are located around a predicted travel route for performing the task assigned to the robot 300 with respect to the position of the robot 300.

Next, obstacle radiuses in which the above obstacles (i.e., the chair A 400, the chair B 600, and the table 500) have influence may be calculated on the basis of at least one of information on motion properties of each of the obstacles and information on a relationship with another obstacle associated with each of the obstacles.

For example, an obstacle radius 410 of the chair A 400 may be calculated on the basis of motion property information indicating that the chair A 400 has no wheels and can travel omnidirectionally, and relationship information indicating that travelable distances of the chair A 400 in the leftward and rightward directions are restricted due to the table 500 located around the chair A 400 (specifically, due to legs 501a and 501b of the table 500). Meanwhile, if a person is located around the chair A 400 as an additional obstacle, an obstacle radius 411 of the chair A 400 may be calculated on the basis of relationship information indicating that travelable distances of the chair A 400 in the forward and backward directions are extended (or increased) due to the depth of the torso when the person is sitting on the chair, or the depth of the legs when the person is standing off the chair.

As another example, if the table 500 is fixed on the floor of the restaurant, an obstacle radius 502 of the table 500 may be calculated on the basis of motion property information indicating that the table 500 cannot travel omnidirectionally and travelable distances of the table 500 in the forward, backward, leftward, and rightward directions are restricted.

As yet another example, if the chair B 600 is fixed on the floor of the restaurant, an obstacle radius 601 of the chair B 600 may be calculated on the basis of motion property information indicating that the chair B 600 cannot travel omnidirectionally and travelable distances of the chair B 600 in the forward, backward, leftward, and rightward directions are restricted.

Next, an optimum travel route along which the robot 300 is to travel may be determined on the basis of the calculated obstacle radiuses and the task assigned to the robot 300.

That is, an optimum travel route for the robot to serve food may be determined on the basis of the above obstacle radiuses of the chair A 400, the chair B 600, and the table 500.

For example, when a customer has eaten food and left the table (i.e., when no person is sitting on the chair), a first route 412 may be determined as an optimum travel route for the robot to serve food.

As another example, when a customer is sitting at the table to eat food (i.e., when a person is sitting on the chair), a second route 413 may be determined as an optimum travel route for the robot to serve food.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be configured to operate as one or more software modules to perform the processes of the present invention, and vice versa.

Although the present invention has been described above in terms of the detailed elements as well as the limited embodiments and drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for determining a travel route of a robot, the system comprising an obstacle identification unit, an obstacle radius calculation unit, a route determination unit, and a drive module, and the method comprising the steps of:
    by the obstacle identification unit, identifying at least one travelable obstacle with respect to a position of a robot;
    by the obstacle radius calculation unit, calculating an obstacle radius in which the at least one obstacle has influence, with reference to information on motion properties of the at least one obstacle, and adjusting the obstacle radius on the basis of information on a relationship with at least one other obstacle associated with the at least one obstacle;
    by the route determination unit, determining an optimum travel route of the robot with reference to the calculated obstacle radius and a task assigned to the robot; and
    by the drive module of the robot, driving the robot to move along the optimum travel route,
    wherein the task assigned to the robot is determined on the basis of at least one of a place where the robot is positioned, a function of the robot, and a structure of the robot,
    wherein in the calculating step, the obstacle radius is calculated by identifying at least one of a travelable direction and a travelable distance of the at least one obstacle with reference to the information on motion properties of the at least one obstacle, and the obstacle radius is adjusted by restricting or extending at least one of the travelable direction and travelable distance of the at least one obstacle with reference to the information on a relationship with the at least one other obstacle, and
    wherein the information on the relationship with the at least one other obstacle includes information on at least one of the travelable direction and travelable distance of the at least one obstacle which are restricted or extended as the at least one obstacle is influenced by the at least one other obstacle when the at least one other obstacle is located within a predetermined distance from the at least one obstacle.

2. The method of claim 1, wherein the at least one obstacle is an obstacle located within a predetermined distance from at least one predicted travel route identified on the basis of the task assigned to the robot.

3. The method of claim 1, wherein the information on motion properties of the at least one obstacle is determined on the basis of at least one of an exterior, a function, and a structure of the at least one obstacle.

4. The method of claim 1, wherein in the determining step, the optimum travel route is determined on the basis of a cost map.

5. A non-transitory computer-readable recording medium having stored thereon a computer program for executing the method of claim 1.

6. A system for determining a travel route of a robot, comprising:
    an obstacle identification unit configured to identify at least one travelable obstacle with respect to a position of a robot;
    an obstacle radius calculation unit configured to calculate an obstacle radius in which the at least one obstacle has influence, with reference to information on motion properties of the at least one obstacle, and adjust the obstacle radius on the basis of information on a relationship with at least one other obstacle associated with the at least one obstacle;
    a route determination unit configured to determine an optimum travel route of the robot with reference to the calculated obstacle radius and a task assigned to the robot; and
    a drive module that moves the robot along the optimum travel route,
    wherein the task assigned to the robot is determined on the basis of at least one of a place where the robot is positioned, a function of the robot, and a structure of the robot,
    wherein the obstacle radius calculation unit is configured to calculate the obstacle radius by identifying at least one of a travelable direction and a travelable distance of the at least one obstacle with reference to the information on motion properties of the at least one obstacle, and the obstacle radius is adjusted by restricting or extending at least one of the travelable direction and travelable distance of the at least one obstacle with reference to the information on a relationship with the at least one other obstacle, and
    wherein the information on the relationship with the at least one other obstacle includes information on at least one of the travelable direction and travelable distance of the at least one obstacle which are restricted or extended as the at least one obstacle is influenced by the at least one other obstacle when the at least one other obstacle is located within a predetermined distance from the at least one obstacle.

* * * * *